US008495058B2

(12) United States Patent
Kulick et al.

(10) Patent No.: US 8,495,058 B2
(45) Date of Patent: Jul. 23, 2013

(54) FILTERING SOCIAL SEARCH RESULTS

(75) Inventors: Matthew E. Kulick, San Francisco, CA (US); Adam D. Bursey, San Jose, CA (US); Maureen Heymans, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/204,155

(22) Filed: Aug. 5, 2011

(65) Prior Publication Data

US 2013/0036109 A1    Feb. 7, 2013

(51) Int. Cl.
*G06F 17/30* (2006.01)

(52) U.S. Cl.
USPC .......................................................... 707/722

(58) Field of Classification Search
USPC .................... 707/3, 5, 722; 709/204; 715/751
See application file for complete search history.

(56) References Cited

U.S. PATENT DOCUMENTS

| | | | |
|---|---|---|---|
| 2008/0059455 A1* | 3/2008 | Canoy et al. | 707/5 |
| 2008/0228776 A1 | 9/2008 | Weiss et al. | |
| 2008/0275846 A1* | 11/2008 | Almas | 707/3 |
| 2009/0204599 A1 | 8/2009 | Morris et al. | |
| 2009/0271247 A1* | 10/2009 | Karelin et al. | 705/10 |
| 2010/0082398 A1 | 4/2010 | Davis et al. | |
| 2010/0153371 A1 | 6/2010 | Singh | |
| 2011/0035329 A1 | 2/2011 | Delli et al. | |
| 2011/0078584 A1* | 3/2011 | Winterstein et al. | 715/751 |
| 2012/0150955 A1* | 6/2012 | Tseng | 709/204 |

OTHER PUBLICATIONS

International Search Report and Written Opinion, International Application No. PCT/US2012/049194, dated Oct. 16, 2012, 7 pages.

* cited by examiner

*Primary Examiner* — Etienne Leroux
(74) *Attorney, Agent, or Firm* — Fish & Richardson P.C.

(57) ABSTRACT

This specification describes technologies relating to searching. In general, aspects of the subject matter described in this specification can be embodied in methods that include the actions of receiving a search query from a user of a search service, identifying search results including general search results responsive to the search query and social search results associated with content generated by one or more members of a user social graph associated with the user that are responsive to the search query, the search results corresponding to digital content stored in one or more computer-readable storage media, determining that a first social search result is associated with a first muted member that is a member of the user social graph, generating filtered search results in response to determining that the social search result is associated with the first muted member, and providing the filtered search results for display to the user.

17 Claims, 10 Drawing Sheets

Web  Images  Maps  News  Shopping  Gmail  more ▼

Google [safari in tanzania]  [Search]  Advance Preferen

Web

402

402a
Tanzania Safari, safaris tanzania, Serengeti, Ngorongoro ...
Offer safaris, Climbs and trips to Zanzibar. Details about the services and destinations.
www.tanzania-adventure.com/ - 40k - Cached - Similar pages - Note this 👤 John Smith shared this on Social Network – 5 minutes ago  } 406a

402b
African Safari in Tanzania, Botswana, Kenya and South Africa
African Safari with Good Earth Tours in Tanzania safari, Kenya safaris, Uganda Safari & Botswana Safari. Also, mount Kilimanjaro climbing and Zanzibar.
www.goodearthtours.com/ - 40k - Cached - Similar pages - Note this

402c
African Safari | Thomson Safaris
Offering private & custom safaris in Tanzania for over 25 years. ... Providing the finest African wildlife safaris exclusively in Tanzania for over 25 years ...
www.thomsonsafaris.com/ - 12k - Cached - Similar pages - Note this 👤 Jane Friend shared this on Network Social – 2 days ago  } 406c

402d
Tanzania Safari, Safaris in Tanzania, Selous safari, Serengeti ...
Design your own Tanzania safari to suit your interests and budget. Travel to the Selous Game Reserve. A Ruaha Safari or a Serengeti safari.
www.wildthingsafaris.com/ - 22k - Cached - Similar pages - Note this

---

See results from your friends                                              404

404a
[image] Safari in Tanzania   by John Friend
We can't speak from experience since this is the only place we went on St pre-trip research it seemed that Tanzania has some of the least ...
maureencedric.blogspot.com/2008/08/safari-in-tanzania.html - 75k -
John Friend  Cached - Similar pages - Note this

*FIG. 4A*

404b
Jane Friend

I'm still alive and am fine! << Tanzania 2006   by Jane Friend
I was on safari, to the Serengeti and the Ngorongoro. I left Tuesday - Intere
actually: I had been talking to several safari companies about the ...
noellejt.wordpress.com/2006/08/06/im-still-alive-and-am-fine/ - 34k -
Cached - Similar pages - Note this 404c
John Smith Youtube - Africa Safari in Tanzania and Kenya
On June 2007 I visited Tanzania and Kenya.. I did some sa
4 min 19 sec - ☆ ☆ ☆ ☆ ☆
www.youtube.com/watch?v=XQ0RZyGSTUs 404d
Bob Smith Tanzania Safari - Lioness on Flickr - Photo Sharing!   by Bob
The copy young lady is one of my favourites, but I didn't get anywhere near
charming she looked.
www.flickr.com/photos/harold_stern/21448122/ - 79k -
Cached - Similar pages - Note this

| Web | Images | Maps | News | Shopping | Gmail | more ▼ |

Google [safari in tanzania] [Search]   Advance / Preferen

Web

502

502a
Tanzania Safari, safaris tanzania, Serengeti, Ngorongoro ...
Offer safaris, Climbs and trips to Zanzibar. Details about the services and destinations.
www.tanzania-adventure.com/ - 40k - Cached - Similar pages - Note this
A friend shared this - Unmute  } 510

502b
African Safari in Tanzania, Botswana, Kenya and South Africa
African Safari with Good Earth Tours in Tanzania safari, Kenya safaris, Uganda Safari & Botswana Safari. Also, mount Kilimanjaro climbing and Zanzibar.
www.goodearthtours.com/ - 40k - Cached - Similar pages - Note this

502c
African Safari | Thomson Safaris
Offering private & custom safaris in Tanzania for over 25 years. ... Providing the finest African wildlife safaris exclusively in Tanzania for over 25 years ...
www.thomsonsafaris.com/ - 12k - Cached - Similar pages - Note this

Jane Friend shared this on Network Social – 2 days ago  } 506c

502d
Tanzania Safari, Safaris in Tanzania, Selous safari, Serengeti ...
Design your own Tanzania safari to suit your interests and budget. Travel to the Selous Game Reserve. A Ruaha Safari or a Serengeti safari.
www.wildthingsafaris.com/ - 22k - Cached - Similar pages - Note this

---

See results from your friends  504

504a

Safari in Tanzania  by John Friend
We can't speak from experience since this is the only place we went on St pre-trip research it seemed that Tanzania has some of the least ...
maureencedric.blogspot.com/2008/08/safari-in-tanzania.html - 75k -
John Friend    Cached - Similar pages - Note this

Jane Friend

I'm still alive and am fine! << Tanzania 2006   by Jane Friend
I was on safari, to the Serengeti and the Ngorongoro. I left Tuesday - Intere
actually: I had been talking to several safari companies about the ...
noellejt.wordpress.com/2006/08/06/im-still-alive-and-am-fine/ - 34k -
Cached - Similar pages - Note this 504c John Smith Youtube - Africa Safari in Tanzania and Kenya
On June 2007 I visited Tanzania and Kenya.. I did some sa
4 min 19 sec - ☆ ☆ ☆ ☆ ☆
www.youtube.com/watch?v=XQ0RZyGSTUs 504d Bob Smith Tanzania Safari - Lioness on Flickr - Photo Sharing!   by Bob
The copy young lady is one of my favourites, but I didn't get anywhere near
charming she looked.
www.flickr.com/photos/harold_stern/21448122/ - 79k -
Cached - Similar pages - Note this See results from muted friends  } 516

FILTERING SOCIAL SEARCH RESULTS

BACKGROUND

The present disclosure relates to searching.

Search engines aim to identify resources (e.g., images, audio, video, web pages, text, documents) that are relevant to a user's needs and to present information about the resources in a manner that is most useful to the user. Search engines return a set of search results in response to a user submitted text query. For example, in response to an image search text query, the search engine returns a set of search results identifying resources responsive to the query.

A large number of search results can be returned for a given query. Consequently, it can be difficult for a searching user to choose a result that is most relevant to the searching user or that provides advice that the searching user is comfortable relying upon. A searching user may give more weight to search results that are associated with reviews, opinions, or other content associated with the searching user's social graph (e.g., contacts of the user) and/or other users. However, these search results can be clouded by content associated with other users.

SUMMARY

This specification describes technologies relating to searching.

A user's social graph includes a collection of connections (e.g., users or resources) identified as having a relationship to the user within a specified degree of separation. The user's social graph can be used to identify search results responsive to a query that are associated with one or more members of the user's social graph. The search results can be filtered to exclude search results associated with one or more members of the user's social graph that the user might be disinterested in viewing.

In general, one aspect of the subject matter described in this specification can be embodied in methods that include the actions of receiving a search query from a user of a search service, identifying search results including general search results responsive to the search query and social search results associated with content generated by one or more members of a user social graph associated with the user that are responsive to the search query, the search results corresponding to digital content stored in one or more computer-readable storage media, determining that a first social search result is associated with a first muted member that is a member of the user social graph, generating filtered search results in response to determining that the social search result is associated with the first muted member, and providing the filtered search results for display to the user. Other embodiments of this aspect include corresponding systems, apparatus, and computer program products.

These and other embodiments can optionally include one or more of the following features: actions further include receiving an identifier associated with the user, and retrieving user profile data from a computer-readable storage device based on the identifier, the user profile date comprising a contact index and a filter index; retrieving user profile data occurs in response to receiving the search query; the contact index provides a list of members of the user social graph; each member of the user social graph is at two or more distinct degrees of separation from the user; the filter index provides a list of muted members, each of the muted members being a member of the user social graph; actions further include: receiving user input, the user input indicating a command to mute a selected member of the user social graph, and in response to receiving the user input, adding the selected member as a second muted member to a filter index associated with the user; actions further include: removing a second social search result associated with the second muted member from the filtered search results to provide modified filtered search results, and providing the modified filtered search results for display to the user; actions further include: receiving user input, the user input indicating a command to unmute the first muted member, and in response to receiving the user input, removing the first muted member from a filter index associated with the user; actions further include: adding the first social search result to the filtered search results to provide modified filtered search results, and providing the modified filtered search results for display to the user; the filtered search results include a mute annotation indicating that a social search result is absent from the filtered search results; the first social search result includes a social annotation that is associated with a general search result, the social annotation indicating that the first muted member shared the general search result when displayed with the general search result; the first social result includes digital content shared by the first muted member; the digital content includes at least one of a digital image, a digital video and text; and the first social search result includes a social annotation to a particular search result, the social annotation being absent from the filtered search results, the particular search result being present in the filtered search results.

Particular embodiments of the invention can be implemented to realize one or more of the following advantages. Search results can be refined using a user's social graph in order to improve the user's search experience and to make content associated with the user's social graph more visible and accessible to the user. The search results can be filtered to remove search results corresponding to one or more members of the user's social graph. The search results can be unfiltered on a member-by-member basis, to include search results corresponding to one or members of the user's social graph that would have been previously filtered. In this manner, the present disclosure enables muting of user's contacts within the context of search.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Aspects of this specification are directed to filtering search results based on social signals. In some examples, search results can be filtered based on a user's social graph. In accordance with aspects of this specification, a searching user can identify one or more other users, for which search results are to be filtered. In some examples, the one or more other users can include members of the searching user's social graph. In some examples, search results can be determined based on a search query provided by a searching user. It can be determined whether the search results include social search results. Social search results can include data generated by one or more users. The one or more users can include members of the searching user's social graph. It can be determined whether a social search result corresponds to a user that has been muted, or otherwise filtered by the searching user. If the search result corresponds to a user that has been muted, a social annotation associated with the search result is not displayed to the searching user. In this manner, the present disclosure enables selective muting of a searching user's contacts within the context of search.

As used in this specification, a social graph can refer to a single social graph or multiple interconnected social graphs. Distinct social graphs can be generated for different types of connections a user has. For example, a user can be connected with chat contacts in one social graph, email contacts in a second social graph, and connections (or contacts) from a particular social networking service in a third social graph. Each social graph can include edges to additional individuals or entities at higher degrees of separation from the user. These contacts can in turn have additional contacts at another degree of separation from the user. Similarly, a user's connection to someone in a particular social network can then be used to identify additional connections based on that person's connections. The distinct social graphs can include edges connecting one or more social graph to one or more other social graphs.

Types of connections and social graphs can include, but are not limited to other users in which the user is in direct contact (e.g., user mail or chat contact, direct contacts on social sites) and users in which the user is in indirect contact (e.g., friends of friends, connections of users that have a direct connection to the user). In some implementations, the social graph includes content generated by individuals (e.g., blog posts, reviews) as connections to the user. The social graph can include connections within a single network or across multiple networks (separable or integrated). Public social graph relationships can also be considered. In some examples, public relationships can be established through public profiles and/or public social networking services.

Figure 1:
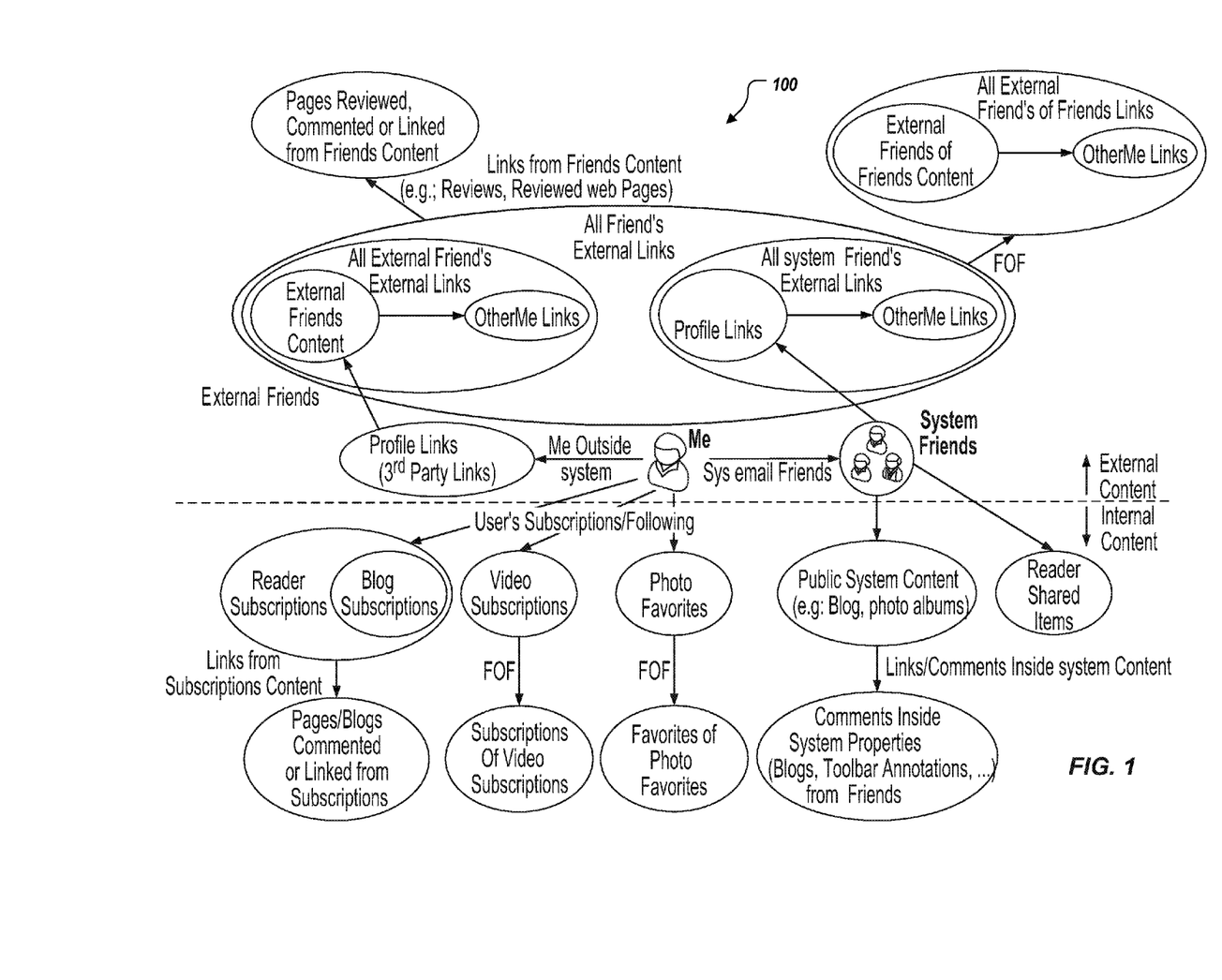
FIG. 1 is a diagram of example sources of social graph information.

FIG. 1 is a diagram 100 of example sources of social graph information. The user's social graph is a collection of connections (e.g., users, resources) identified as having a relationship to the user within a specified degree of separation. The user's social graph can include people and particular content at different degrees of separation. For example, the social graph of a user can include friends, friends of friends (e.g., as defined by a user, social graphing site, or other metric), the user's social circle, people followed by the user (e.g., subscribed blogs, feeds, or web sites), co-workers, and other specifically identified content of interest to the user (e.g., particular web sites).

Diagram 100 shows a user and example connections that extend a user's social graph to people and content both within a system and across one or more external networks and shown at different degrees of separation. For example, a user can have a profile or contacts list that includes a set of identified friends, a set of links to external resources (e.g., web pages), and subscriptions to content of the system (e.g., a system that provides various content and applications including e-mail, chat, video, photo albums, feeds, or blogs). Each of these groups can be connected to other users or resources at another degree of separation from the user. For example, the friends of the user each have their own profile that includes links to resources as well as friends of the respective friends. The connections to a user within a specified number of degrees of separation can be considered the social graph of the user. In some implementations, the number of degrees of separation used in determining the user's social graph can be specified by the user. In some implementations, a default number of degrees of separation is used. Moreover, a dynamic number of degrees of separation can be used that is based on, for example, the type of connection.

In some implementations, the membership and degree of separation in the social graph is based on other factors, including a frequency of interaction. For example, a frequency of interaction by the user (e.g., how often the user visits a particular social graphing site) or type of interaction (e.g., endorsing or selecting items associated with friends). As interaction changes, the relationship of a particular contact in the social graph can also dynamically change. Thus, the social graph can be dynamic rather than static.

In some implementations, social signals can be layered over the social graph (e.g., using weighted edges or other weights between connections in the social graph). These signals, for example, frequency of interaction or type of interaction between the user and a particular connection, can then be used to weight particular connections in the social graph or social graphs without modifying the actual social graph connections. These weights can change as the interaction with the user changes.

Figure 2:
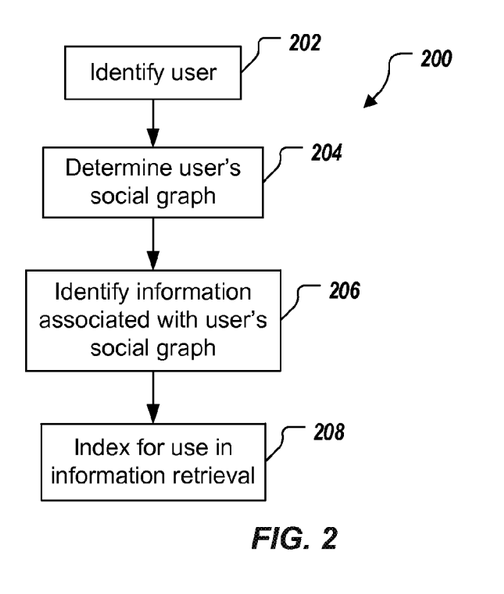
FIG. 2 is a flow diagram of an example method for using social graph information.

FIG. 2 is a flow diagram of an example method 200 for using social graph information. For convenience, the method 200 will be described with respect to a system, including one or more computing devices, that performs the method 200.

The system identifies a user (202). The user can be identified, for example, based on a user profile associated with the system. The user profile can be identified, for example, when the user logs into the system using a username, email address, or other identifier.

The system determines the user's social graph (204). The user's social graph identifies people and resources associated with the user, for example, in which the user has indicated an interest. In some implementations, the social graph is limited to a specified number of degrees of separation from the user or particular relationships or types of interaction with the user. In some implementations, the user's social graph is generated by another system and provided upon request. In some examples, the user's social graph can be provided as an index that identifies each member of the user's social graph and indicates one or more services, through which the user and the member are connected (e.g., email contacts, social networking contacts, etc.).

In some implementations, the user's social graph is determined using user profile data, as well as extracting information from users and resources identified in the user profile data. For example, the user's profile can include a list of the user's friends. The user's friends can include friends within the system (e.g., using a same e-mail or chat service that is affiliated with the system) or external to the system (e.g., social graphs or a list of contacts associated with third party applications or service providers). The user's profile can also include a list of subscriptions to which the user belongs (e.g., identifying content that the user follows, for example, particular blogs or feeds).

The user's profile can also include external links identified by the user. These links can identify particular content of interest. In some implementations, the user's profile also identifies other aliases used by the user (e.g., as associated with particular content providers or social graph sources). For example, a user may have a first identity for a chat application and a second identity for a restaurant review web site. These two identities can be linked together in order to unify the content associated with that user.

The social graph can be further expanded by extracting information from the identified people and content in the user's profile. For example, public profile information can exist for identified friends from which information can be extracted (e.g., their friends, links, and subscriptions). In some implementations, the user can adjust the members of the social graph directly. For example, the user can group their contacts (e.g., e-mail contacts) into particular groups accessed by the system in building the user's social graph.

Similarly, a user can prevent the system from adding members to the user's social graph, for example, by an opt-out option or by keeping contacts out of the particular groups used by the system to generate the social graph. In some other implementations, privacy features provide a user with an opt-in or opt-out option to allow or prevent, respectively, being included (or remove the user if already included) as a member of another's social graph. Thus, users can have control over what personal information or connection information, if any, is included in social graphs.

The system identifies information associated with the user's social graph (206). Identified content associated with the user's social graph can include, for example, content or posting to resources subscribed to by the user (e.g., particular blogs). The identified information can also include content generated by members of the user's social graph. For example, members of a user's social graph can generate content including, for example, local reviews (e.g., for restaurants or services), video reviews and ratings, product reviews, book reviews, blog comments, news comments, maps, public web annotations, public documents, streaming updates, photos and photo albums. Thus, the content can include both content generated by the members of the user's social graph, as well as content endorsed or reviewed by the members of the user's social graph.

The system indexes identified social graph information for use in information retrieval (208). For example, the index can be searched in response to a received search query to identify relevant search results associated with members of the user's social graph. For example, a search system can receive a query and identify both general search results as well as search results based on the indexed social graph information. In some implementations, the indexed social graph information is periodically updated, for example, to include recently added information associated with the user's social graph.

Figure 3:
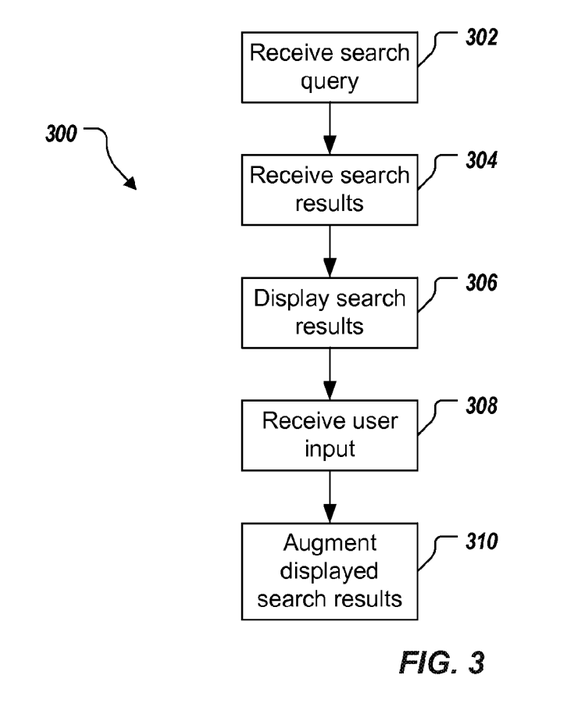
FIG. 3 is a flow diagram of an example method for presenting search results including social graph information.

FIG. 3 is a flow diagram of an example method 300 for presenting search results including social graph information. For convenience, the method 300 will be described with respect to a system including one or more computing devices that performs the method 300.

The system receives a search query from a user (302). For example, the user can input a search query into a search interface of a particular search system. The search query includes one or more terms and can be general or directed to particular types of resources (e.g., a web search or an image search).

The user can submit the search query from a client device. The client can be a computer coupled to the search system through a local area network (LAN) or wide area network (WAN), e.g., the Internet. In some implementations, the search system and the client device is a single machine. For example, a user can install a desktop search application on the client device. The user can submit the search query to a search engine within the search system.

When the user submits the search query, the search query is transmitted through a network to the search system. The search system can be implemented as, for example, computer programs running on one or more computers in one or more locations that are coupled to each other through a network.

The system receives search results including search results associated with the user's social graph (304). For example, when the search query is received by a search engine, the search engine identifies resources that are responsive to the search query using an index. The search engine will generally include an indexing engine that indexes resources (e.g., web pages, images, or news articles on the Internet) found in a corpus (e.g., a collection or repository of content), an index database that stores the index information, and a ranking engine (or other software) to rank the resources that match the query. The indexing and ranking of the resources can be performed using conventional techniques. The social graph information can in be included in a same index as other resources or a separate index. Consequently, a separate search can be performed for general search results responsive to the query, as well as particular search results that identify resources associated with the user's social graph.

In some implementations, the presentation and ranking of search results associated with the user's social graph is adjusted by one or more factors including one or more social signals. For example, affinity can be used to determine whether to show content from a particular member of the user's social graph or whether to promote or demote the member's ranking. Affinity identifies the closeness of a member to the user. For example, a friend of a friend who has five common middle friends with the user has a higher affinity than a friend of a friend who has only one common middle friend. Other factors in determining affinity can include: how a friend is connected to the user (e.g., the source of the connection), which social graphing site the friend is a member of, whether friend or friend of friend, and how many paths to get to the friend of a friend (e.g., common middle friends).

Affinity can also be based on the user's interactions with members of the social graph (e.g., frequency, type). For example, a user that frequently clicks on posts by a particular contact can have a higher affinity with that contact than the affinity with other contacts where they click on respective posts less frequently. Affinity can also be greater for particular types of interactions, for example, comments on contact's posts can result in higher affinity than occasional endorsements. Affinity can change over time. For example, as the types or frequency of interactions change with members of the social graph, the resulting affinity can change as well.

Ranking can also be effected based on other factors, for example, an information retrieval score of social graph content relative to the submitted query (e.g., relevance of the social graph content), content type (e.g., blogs versus images), and the date of the associated content.

Additionally, when interleaving search results associated with the user's social graph along with general search results, a promotion can be applied to the search results associated with the user's social graph in order to increase their visibility. For example, the ranking of search results associated with the user's friends is often lower than a general wide-spread result. Thus, promotion of search results associated with the user's social graph can prevent them from being buried by general search results.

In some implementations, users indicate particular resources as endorsed (e.g., staring a search result or providing an indication at the resource), share resources, quote URLs or otherwise indicate and interest or liking of content, for example, a particular resource, web page, or search result. For example, an application, widget, or scripting can be provided in search results pages, web pages, or within a browser application that allows a user to indicate liking, sharing, or other evaluation of the associated resource or search result. For example, the user can mark a particular resource, web site, or search results to indicate endorsement or other evaluation (e.g., though a browser control or user interface element presented with the associated content).

These interactions performed by members of the user's social graph can be used as social signals to adjust rankings of corresponding search results. For example, if a search query identifies results that include a resource that has been so identified by a member of the user's social graph, this result can be boosted relative to other general search results responsive to the user's query. The boosting factor could be based on, for example, the number of friends who endorsed the identified resource or a top affinity to a friend who endorsed the identified resource. Boosting can also be based on authorship (e.g., what is the relationship or affinity with the individual that endorsed the resource), or the type of endorsement did the member of the user's social graph provide (e.g., an explicit endorsement by starring a result or page or an implicit endorsement by visiting the resource or commenting on a posting).

The system presents one or more of search results including search results from social graph (306). The search engine can transmit the search results through the network to the client device for presentation to the user e.g., as a search results web page to be displayed in a web browser running on the client device. In some implementations, the system clusters search results from the social graph by member of the social graph and presents the responsive results for that member together.

For example, the received search query can be "safari in Tanzania," discussed further below. The system receives search results responsive to the query "safari in Tanzania." This can include search results identifying various tour companies providing safaris in Tanzania. The search results can also include search results associated with the user social graph, for example, a friend's review of a particular safari provider or pictures by friends from their safaris in Tanzania.

The search results can be presented in a number of different ways. The search results can be presented to the user, e.g., as a search results page, that includes one or more of the general search results and the search results associated with the user's social graph. The search results can be presented with separate portions displaying general search results and social graph results, respectively. Alternatively, relevant search results associated with the user's social graph can be interleaved with general search results. Additionally, the results whether displayed separately or interleaved, can be separated by type of content (e.g., web page listings, images).

The search results associated with the user's social graph can also be displayed according to content type (e.g., an image or web page) or clustered according to social graph member. In some implementations, when clustering the results from the social graph by member of the social graph, the content from each member having responsive content will be grouped together for presentation (e.g., the photos and review of friend one followed by the photos of friend two).

The system receives user input refining displayed search results (308). For example, the user can filter the presented search results according to various criteria. The criteria can include, for example, filtering according to a particular friend or source of the resource identified by the search results. Filtering can also be performed according to date (e.g., limiting results displayed to those associated with content posted within a specified time). Additionally, the filtering can limit the presented search results to those associated with the user's social graph.

The system augments the displayed search results (310). For example, if the user input filters the search results according to a particular friend, only search results associated with that friend are presented (e.g., photos, video, reviews, and comments made by that friend). Similarly, if the received user input limits the displayed search results to those associated with the user's social graph, the system augments the displayed search results to only include those results.

In accordance with aspects of this specification, the system can augment the search results to remove, or "mute" social search results and/or social annotations to search results. In some examples search results and/or social annotations to search results can be muted in view of one or more members of the user's social graph. For example, and as discussed in further detail herein, the user can identify one or more members of the user's social graph, for which search results can be muted, and the displayed search results can be absent of associated search results. In some examples, the user can unmute members that had been previously muted. In some examples, a user can mute social search results and/or social annotations to search results by providing user input on a search results page. In some examples, a user can mute social search results and/or social annotations to search results by providing user input to non-search services. For example, a user can provide user input to a social networking service, the user input can indicate that social search results and/or social annotations to search results should be muted for a particular other user of the social networking service.

Figure 4A:
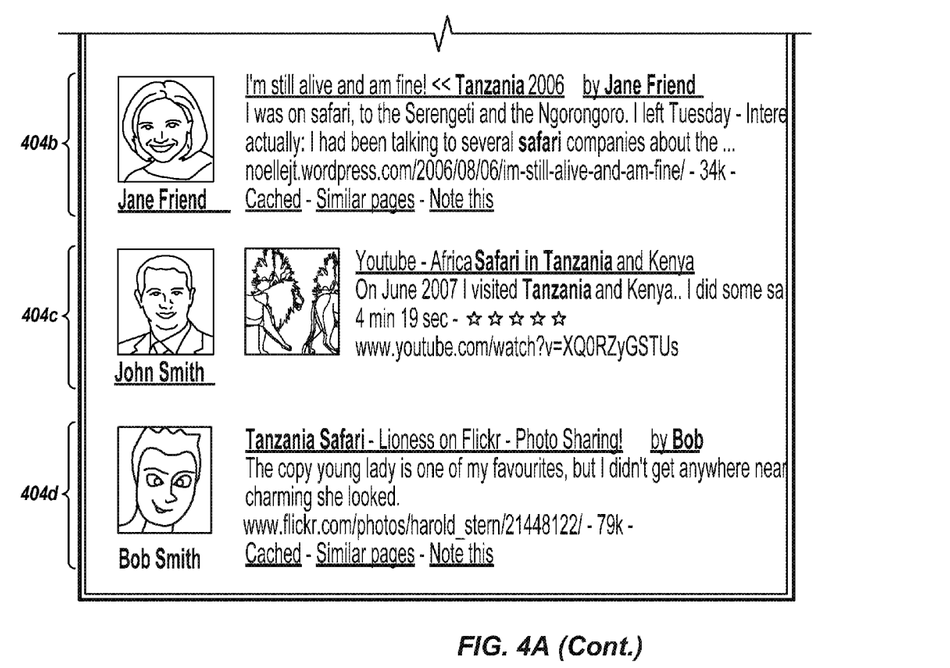
FIG. 4A is a representation of an example search results page including search results associated with the user's social graph.

FIG. 4A is a representation of an example search results page 400 that includes results associated with the user's social graph. The search results page 400 displays example search results responsive to the example query "safari in Tanzania." In the depicted example, the displayed search results include web results 402, as well as results from the user's social graph 404. The web results 402 include search results 402a, 402b, 402c, 402d. The search results 402a, 402c include respective social annotations 406a, 406c. For example, the social annotation 406a indicates that the associated search result was shared by a member of the user's social graph (i.e., the social graph of the user that entered the search query) using a service. In the depicted example, "John Smith" is a member of the user's social graph and shared the search result 402a using a social networking service "Social Network." Similarly, the social annotation 406c indicates that the associated search result was shared by a member of the user's social graph using a service. In the depicted example, "Jane Friend" is a member of the user's social graph and shared the search result 402c using another social networking service "Network Social." In the depicted example, a thumbnail image corresponding to the member of the user's social graph is provided in the social annotations.

The results from friends 404 includes responsive search results associated with a social graph of the user. For example, the results from the user's social graph 404 includes blog postings, video, and photos from people in the user's social graph. Additionally, in some implementations, a representation of the friend is also presented with the search result (e.g., a picture and name of the friend). In some implementations, selecting the particular name of the friend filters the search results based on the friend. In the depicted example, the results from friends 404 include results 404a, 404b, 404c, 404d. The results 404b correspond to the member "Jane Friend," who shared the search results 402c. The results 404c correspond to the member "John Smith," who shared the search results 402a.

Figure 4B:
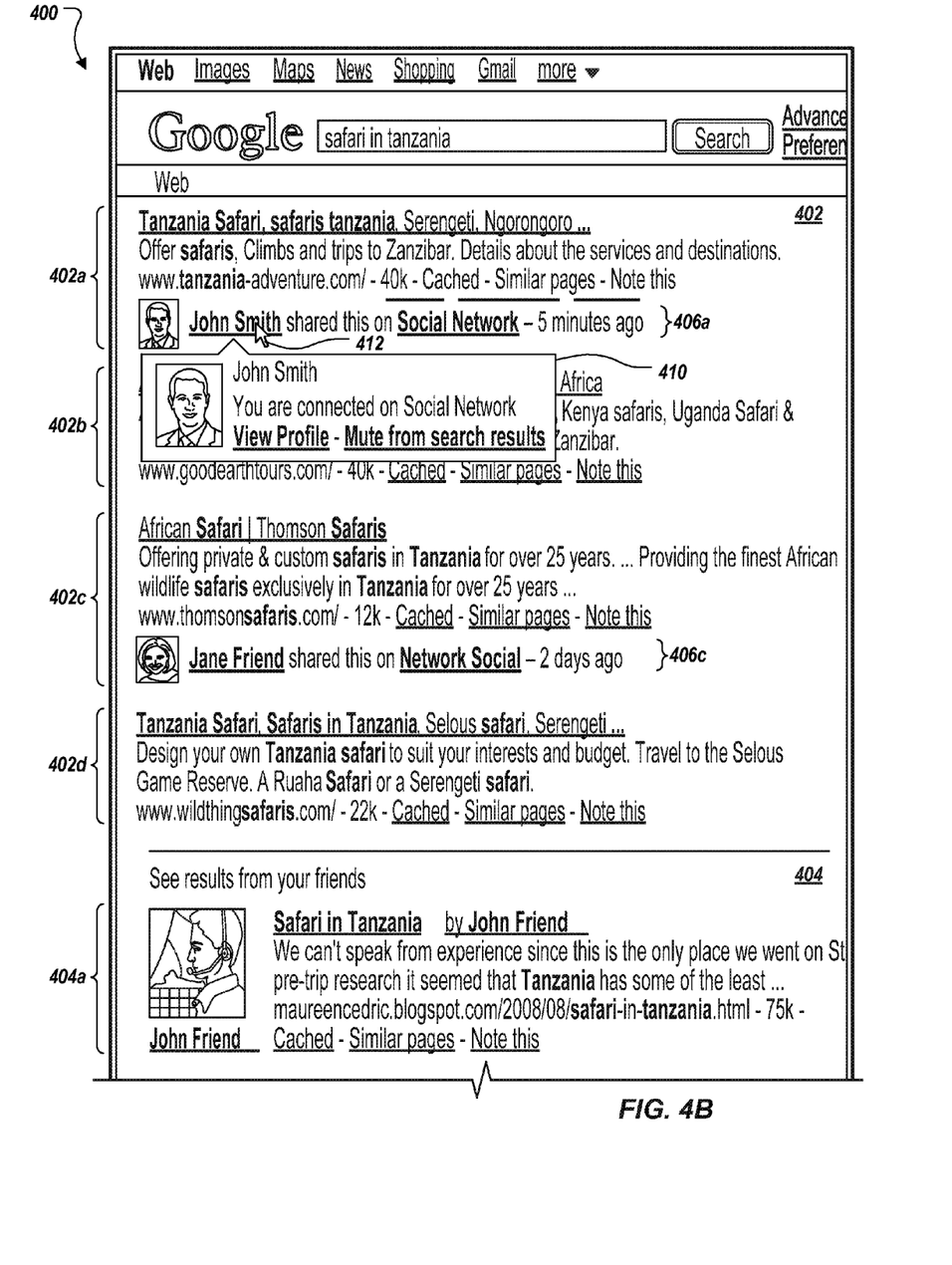
FIG. 4B is a representation of the example search results page of FIG. 4A including an example interface for filtering search results based on the user's social graph.

FIG. 4B is a representation of the example search results page 400 of FIG. 4A including an example interface 410 for filtering search results based on the user's social graph. In the depicted example, a pointer 412 can be displayed on the search results page 400 and can be controlled by the user (e.g., using a mouse). The pointer 412 can be caused to hover over, or otherwise pause on the social annotation 406a. In response to the hover action, the interface 410 can be displayed. The interface 410 can include information regarding the member associated with the social annotation and can provide one or more action options to the user. In the depicted example, the interface 410 includes a thumbnail image of the member, the name of the member, a description of how the member is connected to the user in the user's social graph and provides a plurality of action options.

The action options include a first option to view the member's profile ("View Profile") and a second option to filter the member from the search results ("Mute from search results"). In response to the user clicking on the first option, another web page can be displayed to the user that includes the member's profile within the social networking service. In response to the user clicking on the second option, the member and the corresponding service are added to an index of muted contacts associated with the user. In the depicted example, and in response to the user clicking on the second option, the member John Smith and the service Social Network are added to a filter index. In some examples, the filter index is directly linked to the user's profile and includes a list of members and corresponding services that are to be filtered from search results displayed to the user.

In some implementations, and in view of the addition of John Smith to the filter index, all content items associated with John Smith (e.g., posted and/or shared) will be filtered from search results displayed to the user without considering the underlying service (e.g., social networking, email, image sharing, video sharing). In some implementations, search results can be filtered based on identified user and service pairs. For example, content items associated with John Smith in the context of the social networking service can be filtered, while content items associated with John Smith in the context of other services (e.g., another social networking service, email, image sharing, video sharing) are not filtered from search results displayed to the user.

Figure 5:
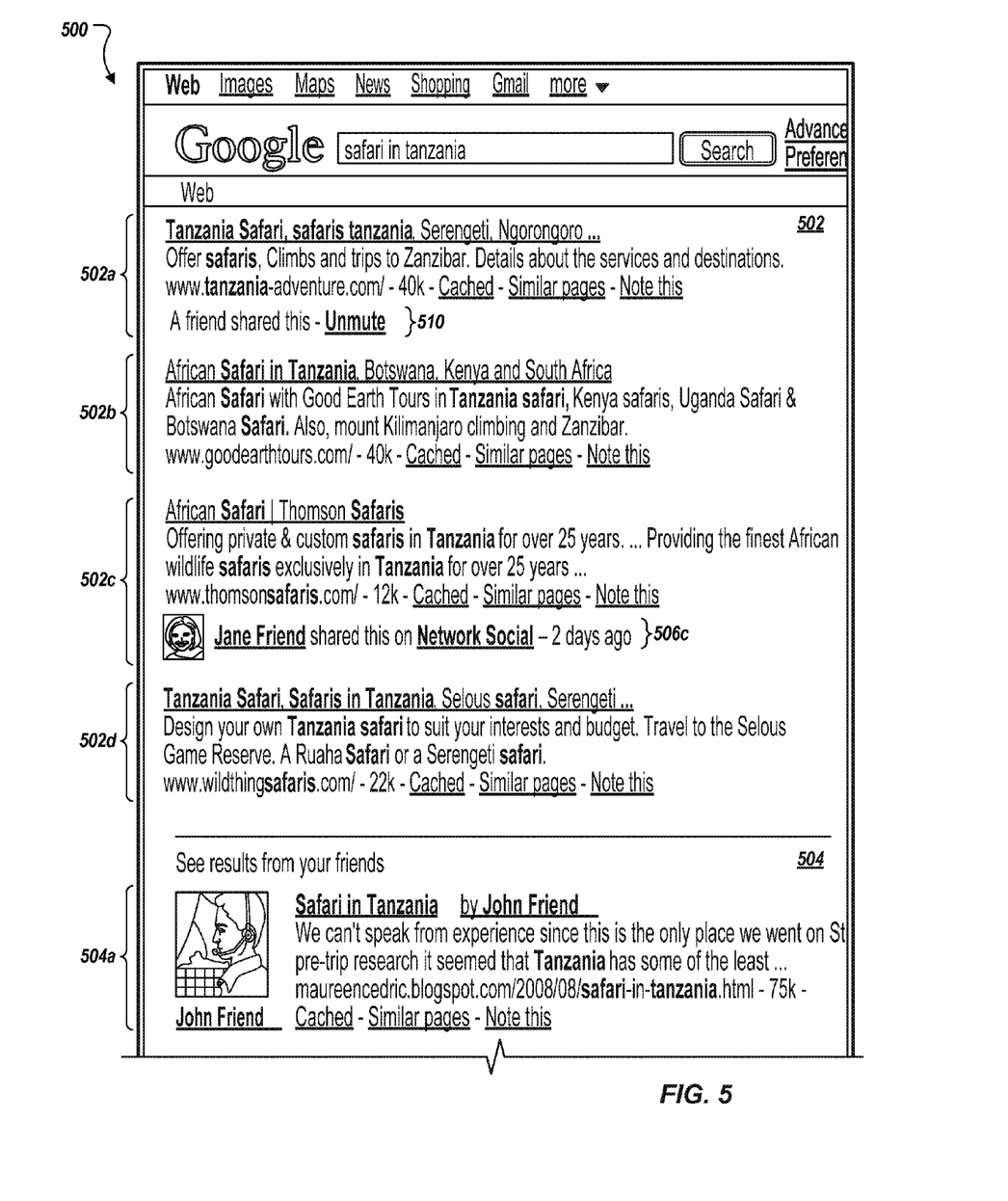
FIG. 5 is a representation of an example augmented search results page corresponding to the example search results page of FIGS. 4A and 4B with example filtering applied.

FIG. 5 is a representation of an example augmented search results page 500 corresponding to the example search results page of FIGS. 4A and 4B with example filtering applied. In some examples, an augmented search results page can be displayed in response to the user selecting the action option to mute a member from search results. In the depicted example, the search results page 500 can be displayed in response to the user selecting the second option of the interface 410.

Within the augmented search results page 500, the displayed search results include web results 502, as well as results from the user's social graph 504. The web results 502 include search results 502a, 502b, 502c, 502d, which correspond to the search results 402a, 402b, 402c, 402d, respectively, of FIGS. 4A and 4B. The search result 502c includes a social annotation 506c that corresponds to the social annotation 406c of FIGS. 4A and 4B. In some examples, the search result 502a can include a mute annotation 510. For example, the mute annotation 510 indicates that a social annotation that could be associated with the search result 502a has been muted. In some examples, the user can click on the mute annotation 510 to retrieve information regarding the member and service that has been muted and to selectively unmute the member.

In the depicted example, the results from friends 504 include results 504a, 504b, 504c, 504d. The results 504c correspond to the member "John Smith," who shared the search results 402a in FIGS. 4A and 4B, and who had been muted by the user in the context of the service "Social Network." In this example, however, the member John Smith had not been muted by the user in the context of other services. For example, the results 504c correspond to a video sharing service ("www.youtube.com") are not muted by the user.

In some examples, all search results corresponding to a muted contact can be filtered from display. For example, although search results corresponding to "John Smith" had been muted in the context of the service "Social Network," all search results corresponding to "John Smith" can be filtered from the search results (e.g., the search results 504c of FIG. 5 would also not be displayed.

In some implementations, the results from friends 504 can include a mute annotation 516. For example, the mute annotation 516 indicates that one or more search results provided in response to the search query have been muted. In some examples, the user can click on the mute annotation 516 to retrieve information regarding the search results that have been muted and to selectively unmute search results corresponding to particular members.

Figure 6:
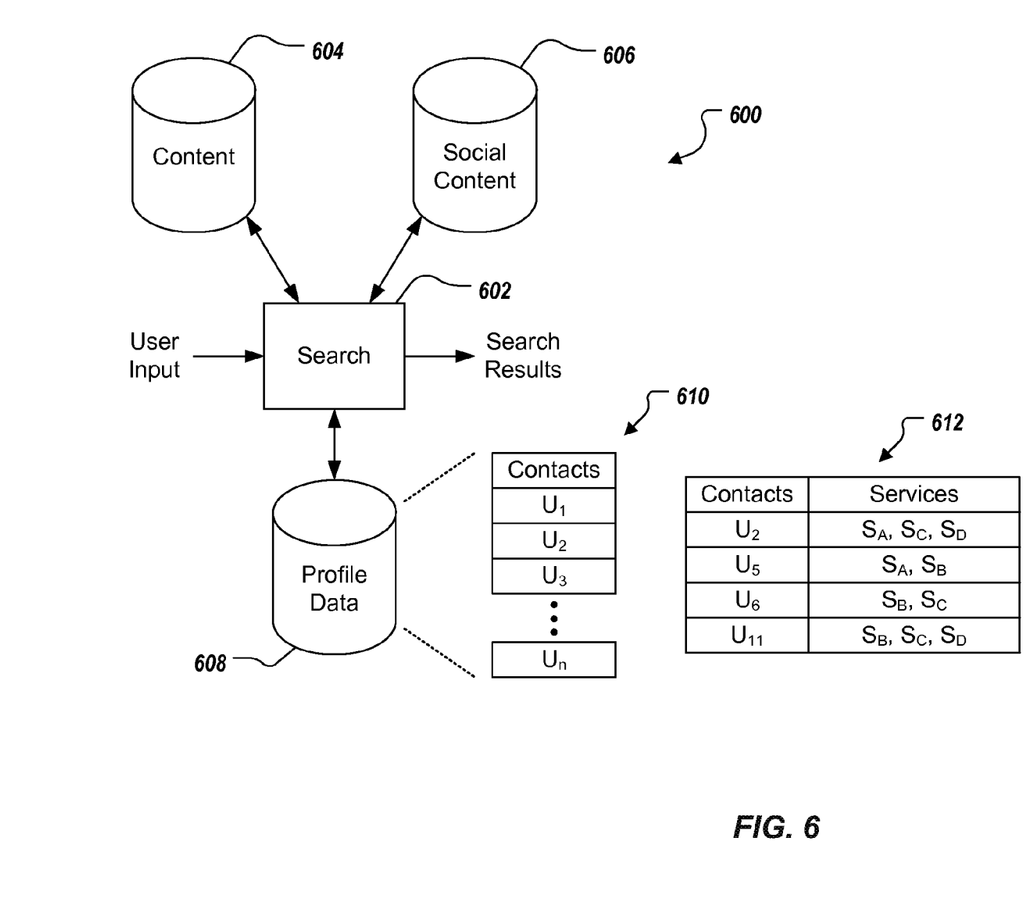
FIG. 6 depicts example components that can be used to filter search results based on a user's social graph.

FIG. 6 depicts example components that can be used to filter search results based on a user's social graph. The example components include a search component 602, a content data source 604, a social content data source 606 and a profile data source 608. In some examples, the search component 602 can be provided as one or more computer programs executed using on or more computing devices (e.g., servers). In some examples, each of the data sources 604, 606, 608 can be provided as one or more computer-readable storage devices (e.g., databases). The search component 602 can communicate with each of the data sources 604, 606, 608 via a network (e.g., a local area network (LAN) or wide area network (WAN), the Internet). The search component 602 receives user input, processes the user input based on data of provided from the data sources 604, 606, 608 and generates search results. The user input can be provided via a computing device (e.g., a client computing device) and the search results can be provided to the computing device for display to the user.

In some examples, the user input can include user log-in information (e.g., username and password) that can be used to log the user into a search service provided by the search component 602. The search component 602 can identify a user profile based on the user input and can retrieve profile data corresponding to the user from the profile data source 608. In some examples, the user profile data can include a contact index 610 and a filter index 612. The contact index 610 can be used to identify members of the user's social graph. For example, the user's social graph can include user's $U_1, \ldots U_n$.

The filter index 612 can be used to identify user, service pairs (filter pairs) that have been muted from search results by the user. In the depicted example, one or more services (S) corresponding to a contact (U) are identified, such that search results corresponding to each of the one or more services and the contact are filtered from display to the user. For example, the user $U_2$ is associated with the services $S_A$, $S_C$, $S_D$ (e.g., social networking services, email services, image sharing services, video sharing services, etc.), corresponding to filter pairs $\{U_2, S_A\}$, $\{U_2, S_C\}$ and $\{U_2, S_D\}$. Consequently, search results that include content associated with $U_2$ within the context of each of the services $S_A$, $S_C$, $S_D$ are filtered from display to the user.

The user input can include a search query that is received by the search component 602. In response to receiving the search query, the search component 602 can process data provided by the content data source 604 and the social content data source 606 to generate search results. In some examples, in response to receiving the search query, the search component 602 can retrieve the contact index 610 and the filter index 612 corresponding to the user that provided the search query (e.g., based on the user's log-in information). The search component 602 processes the search results based on the filter index 612 to generate augmented search results, which are displayed to the user.

Figure 7:
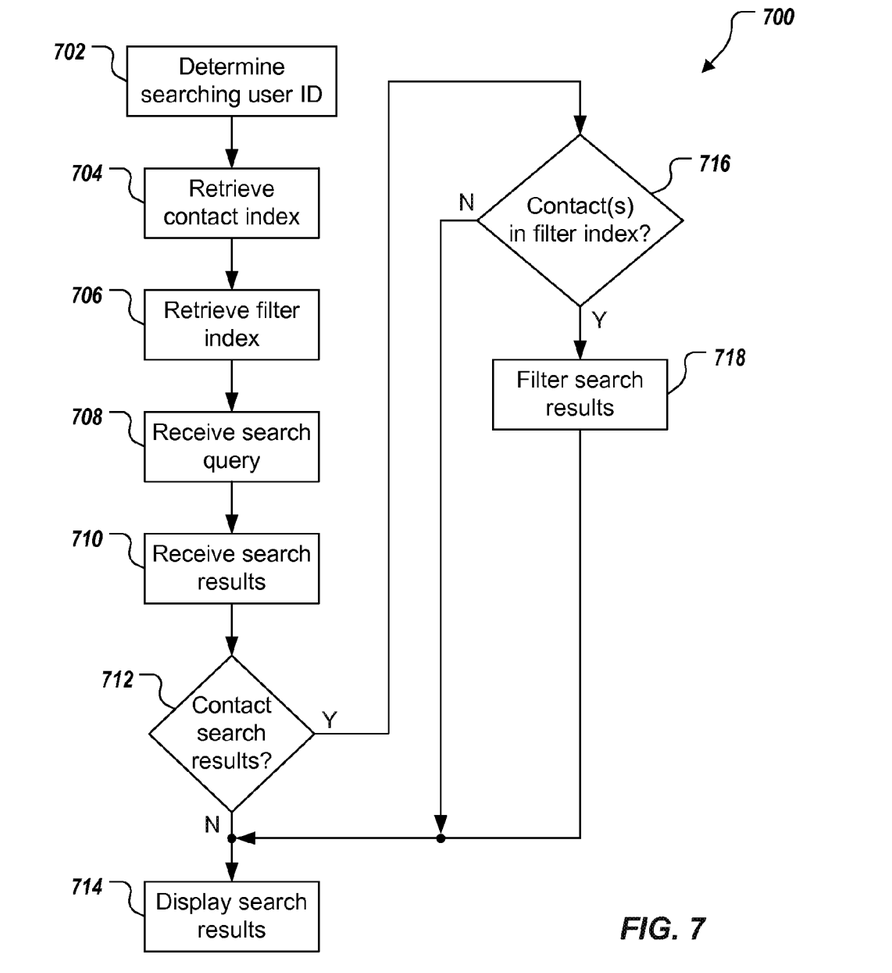
FIG. 7 is a flow diagram of an example method for filtering search results.

FIG. 7 is a flow diagram of an example method 700 for filtering search results. For convenience, the method 700 will be described with respect to a system including one or more computing devices that performs the method 700.

The ID of searching user is determined (702). In some examples, the ID of the searching user (i.e., the user that is performing a search) can be determined based on user log-in information (e.g., username and password). A search query is received (704). A contact index corresponding to the searching user ID is retrieved (706) and a filter index corresponding to the searching user ID is retrieved (708). Search results are generated (710).

It is determined whether the search results include search results associated with one or more contacts within the user's social graph (712). If the search results do not include search results associated with one or more contacts within the user's social graph, the search results are displayed (714). If the search results include search results associated with one or more contacts within the user's social graph, it is determined whether the one or more contacts are identified in the filter index (716). If the one or more contacts are not identified in the filter index, the search results are displayed (714). If at least one contact of the one or more contacts is identified in the filter index, the search results are filtered to remove search results corresponding to each contact identified in the filter index (718), and the search results are displayed (714).

Figure 8:
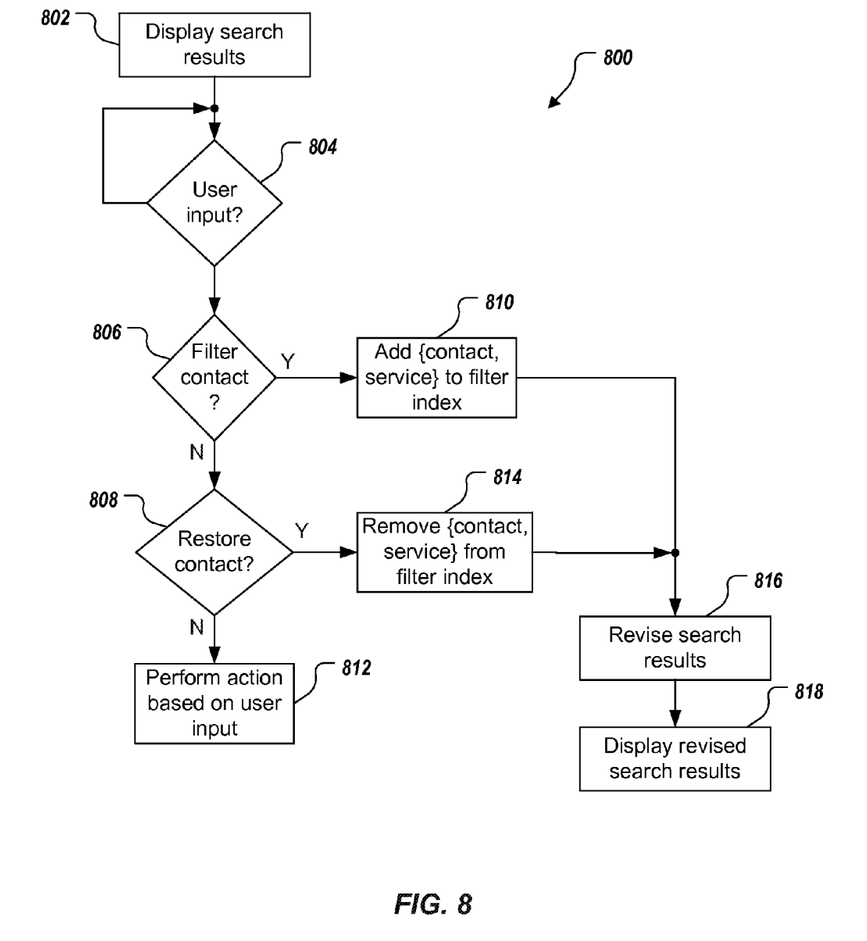
FIG. 8 is a flow diagram of an example method for identifying search results to be filtered based on a user's social graph.

FIG. 8 is a flow diagram of an example method 800 for identifying search results to be filtered based on a user's social graph. For convenience, the method 800 will be described with respect to a system including one or more computing devices that performs the method 800.

Search results are displayed (802). It is determined whether user input is received (804). If user input has not been received, the method 800 loops back. If user input has been received, it is determined whether the user input is a command to filter a contact from search results (806). If the user input is not a command to filter a contact from search results, it is determined whether the user input is a command to restore a contact to search results (808). If the user input is a command to filter a contact from search results, a contact, service pair is added to the filter index corresponding to an identified contact (810). The displayed search results are revised based on the addition of the contact, service pair added to the filter index (816) and revised search results are displayed (818).

If it is determined that the user input is not a command to restore a contact to search results, an action is performed based on the user input (812). For example, the user input can include a selection of a particular search results, and a web page corresponding to the selected search results can be displayed. If it is determined that the user input is a command to restore a contact to search results, a contact, service pair is removed from the filter index corresponding to an identified contact (814). The displayed search results are revised based on the removal of the contact, service pair from the filter index (816) and revised search results are displayed (818).

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method, comprising:
receiving, at a computing device, a search query from a user of a search service;
identifying, using the computing device, search results including general search results responsive to the search query and social search results, the social search results being responsive to the search query and comprising content generated by one or more members of a social graph of the user, the search results corresponding to digital content stored in one or more computer-readable storage media;
determining that a first social search result is associated with a first muted member that is a member of the social graph, the first social search result comprising an annotation associated with a general search result;
generating filtered search results in response to determining that the first social search result is associated with the first muted member, the general search result being included in the filtered search results and the first social search result being absent from the filtered search results; and
providing the filtered search results for display to the user.

2. The method of claim 1, further comprising:
receiving, at the computing device, an identifier associated with the user; and
retrieving user profile data from a computer-readable storage device based on the identifier, the user profile data comprising a contact index and a filter index.

3. The method of claim 2, wherein retrieving user profile data occurs in response to receiving the search query.

4. The method of claim 2, wherein the contact index provides a list of members of the social graph.

5. The method of claim 4, wherein each member of the social graph is at two or more distinct degrees of separation from the user.

6. The method of claim 2, wherein the filter index provides a list of muted members, each of the muted members being a member of the social graph.

7. The method of claim 1, further comprising:
receiving, at the computing device, user input, the user input indicating a command to mute a selected member of the social graph; and
in response to receiving the user input, adding the selected member as a second muted member to a filter index associated with the user.

8. The method of claim 7, further comprising:
removing a second social search result associated with the second muted member from the filtered search results to provide modified filtered search results; and
providing the modified filtered search results for display to the user.

9. The method of claim 1, further comprising:
receiving, at the computing device, user input, the user input indicating a command to unmute the first muted member; and
in response to receiving the user input, removing the first muted member from a filter index associated with the user.

10. The method of claim 9, further comprising:
adding the first social search result to the filtered search results to provide modified filtered search results; and
providing the modified filtered search results for display to the user.

11. The method of claim 1, wherein the filtered search results comprise a mute annotation indicating that a social search result is absent from the filtered search results.

12. The method of claim 1, wherein the annotation comprises a social annotation that indicates that the first muted member shared the general search result when displayed with the general search result.

13. The method of claim 1, wherein the first social result comprises digital content shared by the first muted member.

14. The method of claim 13, wherein the digital content comprises at least one of a digital image, a digital video and text.

15. The method of claim 1, wherein the annotation comprises a social annotation, the social annotation being absent from the filtered search results.

16. A computer storage medium encoded with a computer program, the program comprising instructions that when executed by one or more computers cause the one or more computers to perform operations comprising:
receiving a search query from a user of a search service;
identifying search results including general search results responsive to the search query and social search results, the social search results being responsive to the search query and comprising content generated by one or more members of a social graph of the user, the search results corresponding to digital content stored in one or more computer-readable storage media;
determining that a first social search result is associated with a first muted member that is a member of the social graph, the first social search result comprising an annotation associated with a general search result;
generating filtered search results in response to determining that the first social search result is associated with the first muted member, the general search result being included in the filtered search results and the first social search result being absent from the filtered search results; and
providing the filtered search results for display to the user.

17. A system, comprising:
a computing device; and
a computer-readable medium coupled to the one or more computers having instructions stored thereon which, when executed by the one or more computers, cause the one or more computers to perform operations comprising:
receiving a search query from a user of a search service;
identifying search results including general search results responsive to the search query and social search results, the social search results being responsive to the search query and comprising content generated by one or more members of a social graph of the user, the search results corresponding to digital content stored in one or more computer-readable storage media;
determining that a first social search result is associated with a first muted member that is a member of the social graph, the first social search result comprising an annotation associated with a general search result;
generating filtered search results in response to determining that the first social search result is associated with the first muted member, the general search result being included in the filtered search results and the first social search result being absent from the filtered search results; and
providing the filtered search results for display to the user.

* * * * *